(12) United States Patent
Wu et al.

(10) Patent No.: US 9,576,491 B1
(45) Date of Patent: Feb. 21, 2017

(54) SCHOOL CHILD TRACKING SYSTEM

(71) Applicants: Tian Wu, Madison, AL (US); Li Jiang, Madison, AL (US)

(72) Inventors: Tian Wu, Madison, AL (US); Li Jiang, Madison, AL (US)

(*) Notice: Subject to any disclaimer, the term of this patent is extended or adjusted under 35 U.S.C. 154(b) by 0 days.

(21) Appl. No.: 14/945,205

(22) Filed: Nov. 18, 2015

Related U.S. Application Data

(63) Continuation-in-part of application No. 13/313,625, filed on Dec. 7, 2011, now Pat. No. 9,224,296.

(51) Int. Cl.
| | |
|---|---|
| *G08G 1/123* | (2006.01) |
| *G07C 9/00* | (2006.01) |
| *G06K 17/00* | (2006.01) |
| *G01C 21/34* | (2006.01) |
| *G08B 21/02* | (2006.01) |
| *G08B 13/196* | (2006.01) |
| *G08B 25/01* | (2006.01) |

(52) U.S. Cl.
CPC .............. *G08G 1/123* (2013.01); *G01C 21/343* (2013.01); *G06K 17/00* (2013.01); *G06K 2017/0045* (2013.01); *G07C 9/00071* (2013.01); *G08B 13/19684* (2013.01); *G08B 21/028* (2013.01); *G08B 21/0269* (2013.01); *G08B 25/016* (2013.01)

(58) Field of Classification Search
CPC .................. G01C 21/343; G06K 17/00; G06K 2017/0045; G07C 9/00071; G08G 1/123; G08B 21/0269; G08B 25/016; G08B 13/19684; G08B 21/028

See application file for complete search history.

(56) References Cited

U.S. PATENT DOCUMENTS

| | | | | |
|---|---|---|---|---|
| 6,140,939 | A * | 10/2000 | Flick ........................ | B60R 25/04 340/12.28 |
| 6,313,744 | B1 * | 11/2001 | Capowski ................ | G08B 7/06 340/506 |
| 6,509,868 | B2 * | 1/2003 | Flick ........................ | B60R 25/04 340/467 |
| 6,556,903 | B2 * | 4/2003 | Chinigo ............ | B60R 21/01512 340/433 |
| 6,762,684 | B1 * | 7/2004 | Camhi ............... | G08B 21/0211 340/573.1 |
| 6,992,566 | B2 * | 1/2006 | Striemer .................. | G07C 1/10 340/10.1 |
| 7,034,683 | B2 * | 4/2006 | Ghazarian .............. | G06Q 10/08 340/5.92 |
| 7,233,240 | B2 * | 6/2007 | Phillips .................. | G06K 17/00 340/539.13 |
| 7,383,123 | B2 * | 6/2008 | Park ........................ | G01C 21/36 701/410 |

(Continued)

*Primary Examiner* — Joseph Feild
*Assistant Examiner* — Rufus Point

(57) ABSTRACT

A system for tracking school buses and school children to enhance the security and safety of schoolchildren and provide real-time information about the location of students and buses to teachers and administrators and parents. The system utilizes GPS components to determine a location of the school buses and biometric scanning technology to determine the identity of the students. The system transmits location and student identity data to a Main Station using a radio network component. Parents and school teacher and administrators can access the data to monitor.

7 Claims, 3 Drawing Sheets

(56) References Cited

U.S. PATENT DOCUMENTS

| | | | | |
|---|---|---|---|---|
| 8,594,934 B2* | 11/2013 | Oriet | ............... | G01C 21/343 |
| | | | | 340/539.13 |
| 8,624,727 B2* | 1/2014 | Saigh | ............... | H04W 4/025 |
| | | | | 340/539.1 |
| 8,730,047 B2* | 5/2014 | Ridder | ............ | A61B 5/0075 |
| | | | | 340/573.1 |
| 9,224,296 B1* | 12/2015 | Wu | ............... | G08G 1/123 |
| 2004/0203408 A1* | 10/2004 | Wen | ............... | H04W 4/02 |
| | | | | 455/66.1 |
| 2004/0251304 A1* | 12/2004 | Carmon | ......... | G06K 17/0022 |
| | | | | 235/382 |
| 2005/0131625 A1* | 6/2005 | Birger | ............... | G06Q 10/08 |
| | | | | 701/117 |
| 2005/0250440 A1* | 11/2005 | Zhou | ............... | G01S 5/0027 |
| | | | | 455/12.1 |
| 2006/0017541 A1* | 1/2006 | Nguyen | ........... | G07C 9/00111 |
| | | | | 340/5.81 |
| 2006/0068840 A1* | 3/2006 | Sherman | ......... | G06Q 10/06 |
| | | | | 701/1 |
| 2007/0152850 A1* | 7/2007 | Pechenick | ...... | G06Q 30/0249 |
| | | | | 340/988 |
| 2007/0171047 A1* | 7/2007 | Goodman | ....... | G01S 5/0072 |
| | | | | 340/539.13 |
| 2008/0054072 A1* | 3/2008 | Katragadda | ..... | G08G 1/123 |
| | | | | 235/384 |
| 2010/0060452 A1* | 3/2010 | Schuster | ........ | G08B 13/2402 |
| | | | | 340/572.1 |
| 2010/0295687 A1* | 11/2010 | Kuzniar | ......... | A01K 11/006 |
| | | | | 340/573.3 |
| 2011/0050463 A1* | 3/2011 | Yu | ............... | G01S 5/0027 |
| | | | | 340/993 |
| 2015/0061895 A1* | 3/2015 | Ricci | ............. | H04W 4/22 |
| | | | | 340/902 |

* cited by examiner (In-use View)

SCHOOL CHILD TRACKING SYSTEM

CROSS REFERENCE

This application is a continuation-in-part and claims benefit of U.S. patent application Ser. No. 13/313,625, filed Dec. 7, 2011, the specification(s) of which is/are incorporated herein in their entirety by reference.

FIELD OF THE INVENTION

The present invention relates to systems and devices tracking school buses and children who ride the bus to and from school.

BACKGROUND OF THE INVENTION

Due to the alarmingly higher occurrences of school shootings over the past years, parents of school children have grown increasingly concerned about the safety of their school children, especially when the school children leave a school campus and travel back to their respective bus stops. In addition, if the child is unsure of his or her bus stop, the child can miss the bus stop and be dropped off at the wrong location. Further, if a school bus accident occurs or if the school bus is hijacked, the parents and the school are left unaware of the location of the school children. It is believed that the current education system lacks adequate safety systems for the tracking of school children and school buses. Hence, there is a need for a safety system to track the whereabouts of school children and school buses.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

It is an objective of the present invention to provide for a system that can generate and track information about the location of a school bus and school children in real-time, which can be monitored by teachers, administrators, and parents, thereby enhancing the security and safety of school children In one aspect, the present invention features a system for tracking school buses and schoolchildren to enhance the security and safety of schoolchildren and provide real-time information about the location of students and school buses, both to teachers and administrators and parents. The system may comprise at least one instance of a client software component; one or more client microprocessors; at least one instance of a school bus software component; a school bus microprocessor; a radio network component comprising a Main Station, a Main Station software component, a radio transmitter module, and a set of repeaters; at least one Global Positioning System ("GPS") component, and a biometric scanning component. The Main Station may further comprise a Main Station microprocessor.

DESCRIPTION OF PREFERRED EMBODIMENTS

Figure 1:
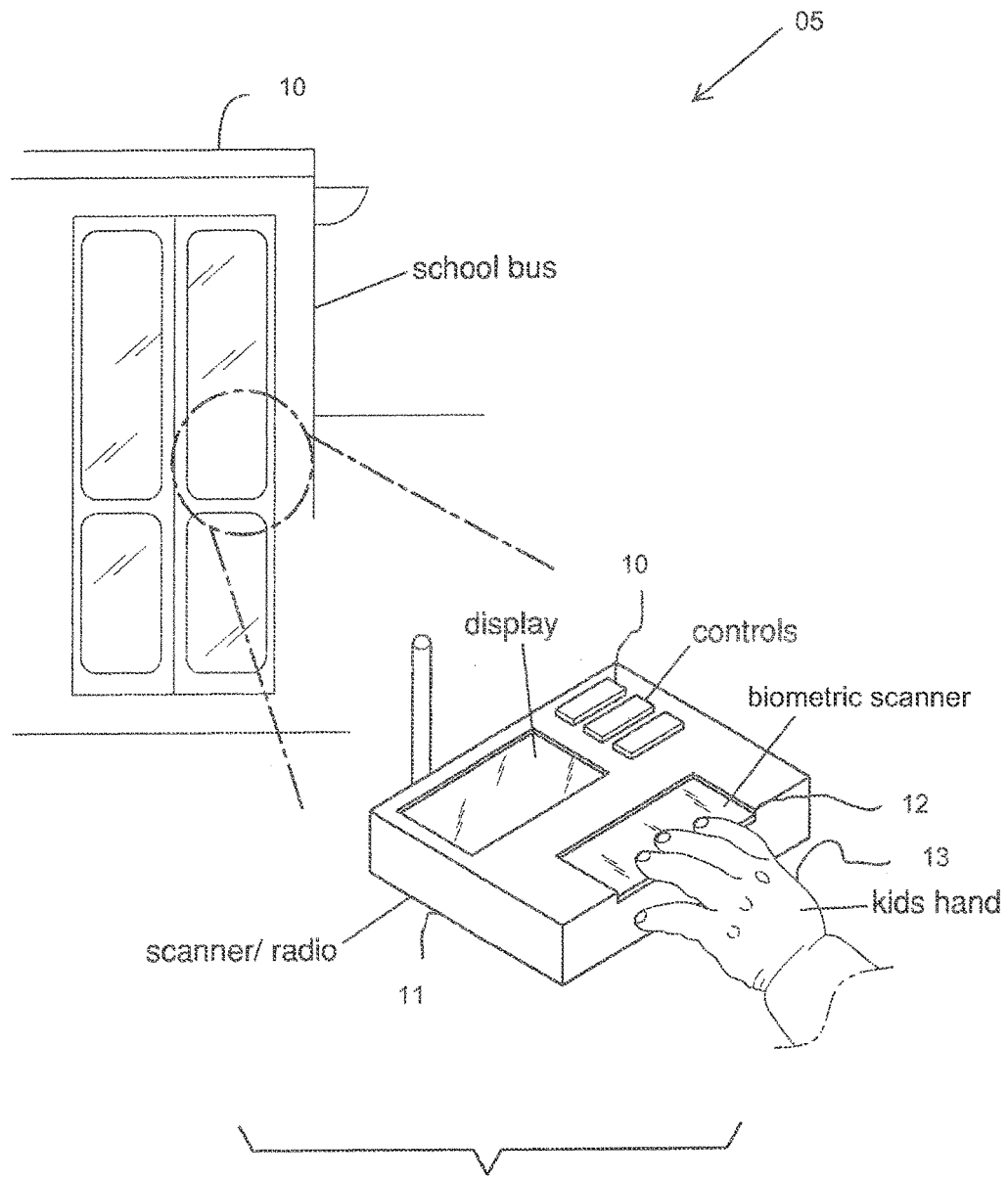
FIG. 1 depicts a biometric input component according to an embodiment [05] of the present invention.
Figure 2:
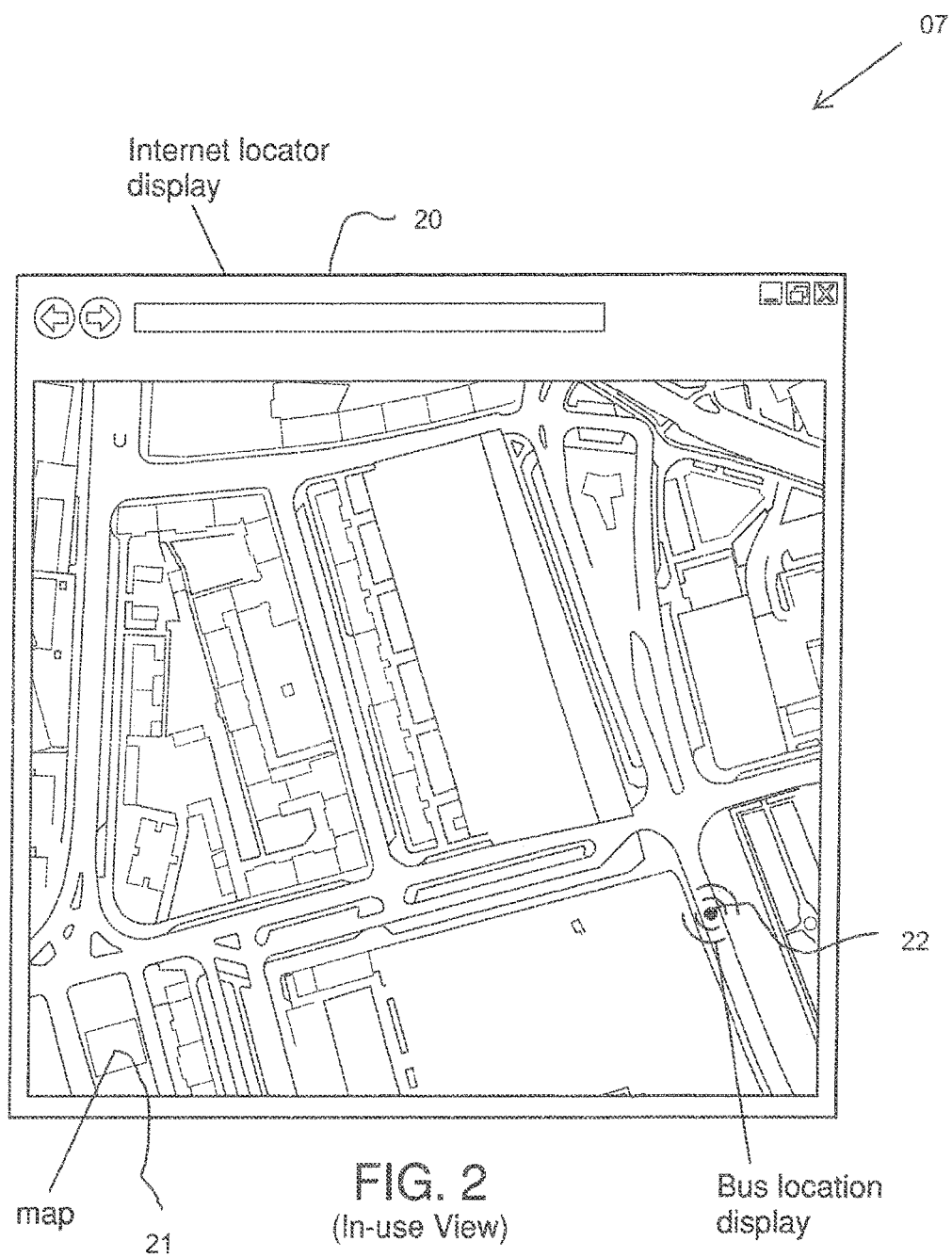
FIG. 2 shows an in-use view of the GPS component according to an embodiment [07] of the present invention.
Figure 3:
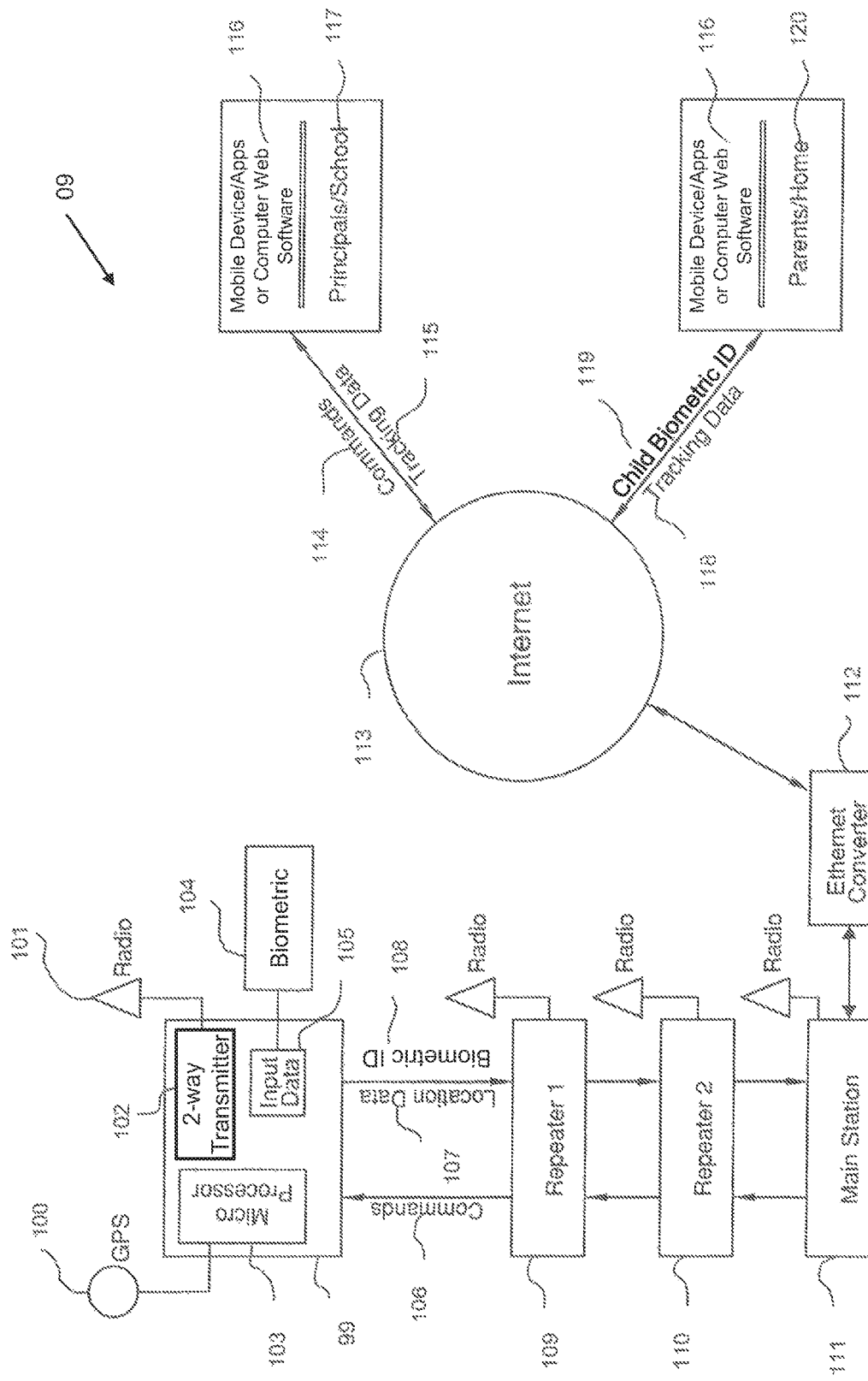
FIG. 3 illustrates a non-limiting exemplary schematic of the tracking system [09] of the present invention.

Following is a list of elements corresponding to a particular element referred to herein:
- 99 school buses
- 100 Global Positioning System ("GPS") component
- 101 radio network component
- 102 radio transmitter module
- 103 school bus microprocessor
- 104 biometric scanning component
- 109, 110 set of repeaters
- 103 school bus microprocessor
- 111 Main Station
- 113 network
- 116 client software component
- 117 teachers and administrators
- 120 parents Referring now to FIG. 1-3, the present invention features a system for tracking school buses [99] and schoolchildren to enhance the security and safety of schoolchildren and provide real-time information about the location of students and school buses, both to teachers and administrators [117] and parents [120]. According to one embodiment, the system may comprise at least one instance of a client software component [116]; one or more client microprocessors; at least one instance of a school bus software component; a school bus microprocessor [103]; a radio network component [101] comprising a Main Station [111], a Main Station software component, a radio transmitter module [102], and a set of repeaters [109,110]; at least one Global Positioning System ("GPS") component [100], and a biometric scanning component [104]. The Main Station [111] preferably comprises a Main Station microprocessor.

As used herein, the "client" can be a teacher, administrator, [117] or a parent. [120], or any other party such as law enforcement where it would make sense to grant access to said third party for monitoring the system. In some embodiments, the one or more client microprocessors are each located on a computer-readable medium. The computer-readable medium may be an electronic device such as a personal computer, a cell phone, or tablet. The client microprocessors may be configured to receive and process data transmitted, over a network [113], by the Main Station microprocessor. The client microprocessors may be utilized by one or more teachers and administrators [117] or one or more parents [120].

In other embodiments, the client software component [116] is hosted on a data storage unit and executed by the one or more client microprocessors. The client software component may comprise a set of code instructions that enables the teachers and administrators [117] or the parents [120] to track the location of at least one school bus [99] and a school child by communicating with and receiving data from, over the network [113], the Main Station microprocessor located at the Main Station [111]. In further embodiments, the client software component [116] comprises a mobile application hosted on a cell phone or other mobile device.

According to one embodiment, the school bus microprocessor [103] and the school bus software component may be located on the school bus [99]. The school bus microprocessor [103] may be configured to receive data from the GPS component [100] and the biometric scanning component [104]. The school bus microprocessor [103] is further configured to transmit said data to the Main Station [111] microprocessor via the radio network component [101]. According to another embodiment, the school bus software component is hosted on and execute by the school bus microprocessor [103]. The school bus software component may comprise a set of code instructions that enables the school bus microprocessor [103] to communicate with and transmit data to the Main Station [111] using the radio network component [101].

In preferred embodiments, the radio network component [101] enables the existence of a radio network, thereby permitting the Main Station [111] to transmit to and receive information from the school bus [99]. For example, the radio network component [101] can be a set of multiple parts making up the radio network. The multiple parts can be the Main Station [111] and the school bus [99], the radio transmitter module [102], and the set of repeaters [109,110].

Preferably, the Main Station can act as a central hub for coordinating information between the school buses and the clients. For instance, the Main Station [111] can receive data about the school bus [99] via the radio network component [101] and re-transmit said data to the client microprocessors over the network [113].

In one embodiment, the Main Station software component is hosted on and executed by the Main Station microprocessor. In one aspect, the Main Station software component is a particular version of the software component that integrates the Main Station into the system. The Main Station software component may comprise a set of code instructions that enables the Main Station microprocessor to communicate with and transmit and receive data from the school bus microprocessor [103] via the radio network component [101]. The set of code instructions further enables the Main Station microprocessor to communicate with and transmit data to the one or more client microprocessors over the network [113].

In some embodiments, the radio transmitter module [102] is located on the school bus. The radio transmitter module [102] may be a two-way radio transmitter module. In other embodiments, the set of repeaters [109,110] collects data from the two-way radio transmitter module and repeats it to provide greater range of coverage.

It is desired for the GPS component [100] to be operatively connected to the school bus [99] and the school bus microprocessor [103]. The GPS component [100] is preferably located on the school bus [99] and configured to transmit real-time geospatial information about the school bus [99] to the Main Station microprocessor. The GPS component can comprise any standard GPS device available on the public market.

In preferred embodiments, the biometric scanning component [104] is operatively connected to the school bus microprocessor [103] and located on the school bus [99]. The biometric scanning component [104] can identify the school children and allow the system to track the boarding of the school children by recognizing the unique biometric identification (ID) of each of the schoolchildren. In some embodiments, the biometric scanning component [104] may comprise a biometric ID device such as facial recognition device, a fingerprint scanning device, an iris recognition device, a retina scanning device, or a voice recognition device. However, it is understood that the biometric scanning component [104] is not limited by the aforementioned examples.

As used herein, biometrics is the measurement and statistical analysis of a person's physical and/or behavioral characteristics. Each person possesses unique characteristics and can be identified by his or her intrinsic physical or behavioral traits. To illustrate the use of the biometric scanning component [104], the schoolchild may input his or her biometric each time the child boards the school bus. For instance, the child may swipe his or her fingerprint on a fingerprint scanning device, or speak into a voice recognition device, or have his or her eye scanned by an iris recognition device or a retina scanning device, or have his or her face scanned by a facial recognition device.

In other embodiments, the school child can also input his or her biometric upon exiting the school bus. For example, the biometric scanning component [104] and the GPS component [100] may be configured such that when the school child exits the school bus [99] and interacts with the biometric scanning component [104] a second time, information is generated for the school bus microprocessor [103] for further transmittal to the parent or teacher about when and where the school child exited the school bus. This assures the parent or teacher that the school child has reached his or her destination.

According to one embodiment, when the system is in use, the school bus microprocessor [103] is activated and the biometric ID of each student entering the school bus [99] is scanned using the biometric scanning component [104]. The GPS component [100] is activated to allow the system to track the location of the school bus [99]. Information about the number of and identity of school children on the school bus [99] and the location of the school bus [99] is transmitted from the school bus microprocessor [103] to the Main Station microprocessor via the radio network component [101], which permits the Main Station [111] to transmit and receive information from the school bus [99]. The information about the number and identity of school children on the school bus [99] and the location of the school bus [99] is re-transmitted, over the network [113], from the Main Station microprocessor [111] to one or more of the client microprocessors. The system may be used in every school bus [99] of the school.

Without wishing to limit the present invention to a particular function or mechanism, the system can enhance the security and safety of school children by generating and tracking, in real-time, information about the location of the school bus [99] and school children for monitoring of said information by teachers and administrators [117] and parents [120].

In some embodiments, the system may further comprise a motion sensor component located on one or more school buses [99]. The motion sensor component is configured to direct the school bus microprocessor [103] to send a command, over the radio network [101], to the Main Station [111] microprocessor indicating that the school bus [99] is or is not in motion. In one embodiment, the system can send an alert to a Main Station [111] when the motion sensor determines that the school bus [99] is not moving. For example, the system sends an alert to a Main Station [111] when the motion sensor determines that the school bus [99] has not moved for a period of time, such as at least five minutes, which may indicate that there is a problem with the school bus. For instance, the school bus may have been in an accident, or the school bus is having mechanical problems.

The present invention, in some embodiments, is a proposed security system for schools to provide for real-time tracking and audit-trial documentation of boarding and exiting of school children on and movement of a school bus.

Unlike the prior art, which proposes the use of sensors or mobile devices to track the location of school children when boarding or exiting a school bus, in one embodiment, the present invention utilizes a novel system of biometric scanning components which are configured such that a student can input his or her biometric and be identified and tracked when boarding or exiting a school bus. It is believed that this system is advantageous because this tracking system does not require school children to carry around mobile devices and does not require the expensive placement of multiple sensors on a school bus.

A non-limiting example of a typical process utilizing the system can comprise the following steps:
  i. activating a first school bus microprocessor [103] located on a first school bus [99];
  ii. scanning the biometric ID of a first student entering the first school bus [99] using the biometric scanning component [104];
  iii. repeating step (ii) x times, where x=the number of children that board the first school bus [99];
  iv. activating the GPS component [100] on the first school bus [99] to allow the system to track the location of the first school bus [99];
  v. transmitting information about the number of and identity of school children on the first school bus [99] and the location of the first school bus [99] from the school bus microprocessor [103] to the Main Station [111] microprocessor, via the radio network component [101];
  vi. re-transmitting said information, over the network [113], about the number of and identity of school children on the first school bus [99] and the location of the first school bus [99] from the Main Station microprocessor [111] to one or more of the client microprocessors; and
  vii. repeating steps (i) through (vi) y amount of times, where y=the total number of school buses within the system.

In one embodiment, the present invention utilizes a biometric scanner, together with other data collection components and wired or wireless equipment to create a record of every school child that boards a school bus and provide real-time information about the speed and location of the school bus that the school children have boarded.

As used herein, the term "student" maybe used interchangeably with and also refers to a "school child".

While the claims refer to "teachers and administrators" or "parents" being the clients utilizing a client microprocessor for receiving information about the school buses and school children, the present invention is not limited to these categories and could comprise a number of different clients including for example, law enforcement.

In some embodiments, the radio transmitter module can be two-way radio transmitter module that can use any appropriate radio frequency. In one embodiment, the radio frequency does not require an FCC license. For example, the radio frequency can be at 915 megahertz or 2.45 gigahertz.

As used herein, the radio repeater is a combination of a radio receiver and a radio transmitter that receives a weak or low-level signal and retransmits it at a higher level or higher power, so that the signal can cover longer distances without degradation. In other embodiments, the repeater collects data from the two-way radio transmitter module and repeats it to provide greater range of coverage. In further embodiments, the present invention may utilize multiple repeaters.

As recited in the claim language, the Main Station is the device where all the data is eventually gathered from the repeaters. The Main Station can be configured to process the data it receives from the radio transmitter modules located on the individual school buses, and then the Main Station can send the data to the internet server for the parent and teachers use.

As used herein, the term "about" refers to plus or minus 10% of the referenced number. For example, an embodiment wherein the device is about 10 inches in length includes a device that is between 9 and 11 inches in length.

As used herein, the term "about" refers to plus or minus 10% of the referenced number.

The disclosures of the following U.S. Patents are incorporated in their entirety by reference herein: U.S. Pat. No. 6,140,939; U.S. Pat. No. 6,6,509,868; U.S. Pat. No. 6,556,903; U.S. Pat. No. 6,992,566; U.S. Pat. No. 7,034,683; U.S. Pat. No. 7,233,240; U.S. Pat. No. 7,383,123; U.S. Pat. No. 8,594,934; U.S. Publication No. 2004/0203408; U.S. Publication No. 2004/0251304; U.S. Publication No. 2005/0131625; U.S. Publication No. 2005/0250440; U.S. Publication No. 2007/0152850; U.S. Publication No. 2007/0171047; and U.S. Publication No. 2011/0050463.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A system for tracking school buses [99] and school children to enhance the safety of the school children and provide real-time information on a location of the school children and school buses [99] to teachers and administrators and parents [120], the system comprising:
  a. one or more client microprocessors, each located on a computer-readable medium, whereby the client microprocessors are configured to receive data transmitted by a Main Station microprocessor over a network [113], and whereby the client microprocessors are utilized by one or more teachers and administrators [117] or one or more parents [120];
  b. at least one instance of a client software component [116], hosted on a data storage unit and executed by the one or more client microprocessors, whereby the client software component comprises a set of code instructions that enables the teachers and administrators [117] or the parents [120] to track the location of at least one school bus [99] and a school child by communicating with and receiving data from, over the network [113], the Main Station microprocessor located at a Main Station [111];

c. a school bus microprocessor [103] located on the school bus [99], whereby the school bus microprocessor [103] is configured to receive data from a GPS component [100] and a biometric scanning component [104], and transmit said data to the Main Station [111] microprocessor via a radio network component [101]

d. at least one instance of a school bus software component, hosted on and execute by the school bus microprocessor [103] and further located on the school bus [99], whereby the school bus software component comprises a set of code instructions that enables the school bus microprocessor [103] to communicate with and transmit data to the Main Station [111] using the radio network component [101];

e. the radio network component [101] comprising:
  i. the Main Station [111] comprising the Main Station microprocessor, wherein the Main Station [111] receives data about the school bus [99] via the radio network component [101] and can re-transmit said data to the client microprocessors over the network [113];
  ii. a Main Station software component, hosted on and executed by the Main Station microprocessor, whereby the Main Station software component comprises a set of code instructions that enables the Main Station microprocessor to communicate with and transmit and receive data from the school bus microprocessor [103] via the radio network component [101], and whereby the set of code instructions enables the Main Station microprocessor to communicate with and transmit data to one or more of the client microprocessors over the network [113];
  iii. a radio transmitter module [102] located on the school bus, wherein the radio transmitter module [102] is a two-way radio transmitter module; and
  iv. a set of repeaters [109,110], wherein the repeaters [109,110] collects data from the two-way radio transmitter module and repeats it to provide greater range of coverage;

whereby the radio network component [101] enables the existence of a radio network which permits the Main Station [111] to transmit to and receive information from the school bus [99], f. at least one Global Positioning System ("GPS") component [100], operatively connected to the school bus [99] and the school bus microprocessor [103], and located on the school bus [99], whereby the GPS component [100] is configured to transmit real-time geospatial information about the school bus [99] to the Main Station microprocessor; and g. the biometric scanning component [104], operatively connected to the school bus microprocessor [103] and located on the school bus [99], whereby the biometric scanning component [104] identifies and tracks the boarding of the school children corresponding to a unique biometric identification (ID) of each of the schoolchildren;

wherein for each school bus [99], when the system is in use, the school bus microprocessor [103] is activated, wherein the biometric ID of each student entering the school bus [99] is scanned using the biometric scanning component [104], wherein the GPS component [100] is activated to allow the system to track the location of the school bus [99], wherein information about the number of and identity of school children on the school bus [99] and the location of the school bus [99] is transmitted from the school bus microprocessor [103] to the Main Station microprocessor via the radio network component [101], which permits the Main Station [111] to transmit and receive information from the school bus [99], wherein said information about the number of and identity of school children on the school bus [99] and the location of the school bus [99] is re-transmitted, over the network [113], from the Main Station microprocessor [111] to one or more of the client microprocessors, whereby the system, in real-time, generates and tracks information about the location of the school bus [99] and school children for monitoring of said information by teachers and administrators [117] and parents [120] thereby enhancing the security and safety of school children.

2. The system of claim 1, whereby the system further comprises a motion sensor component located on one or more school buses [99] whereby the motion sensor component is configured to direct the school bus microprocessor [103] to send a command, over the radio network [101], to the Main Station [111] microprocessor indicating that the school bus [99] is or is not in motion.

3. The system of claim 2, whereby the system sends an alert to a Main Station [111] when the motion sensor determines that the school bus [99] is not moving.

4. The system of claim 2, whereby the system sends an alert to a Main Station [111] when the motion sensor determines that the school bus [99] has not moved for a period of time.

5. The system of claim 4, wherein the period of time is at least five minutes.

6. The system of claim 1, whereby the client software component [116] comprises a mobile application hosted on a cell phone or other mobile device.

7. The system of claim 1, whereby the biometric scanning component [104] and the GPS component [100] are further configured such that when a school child exits the school bus [99], the school child interacts with the biometric scanning component [104] a second time, thereby generating information for the school bus microprocessor [103] for further transmittal to the parent or teacher [117] about when and where the school child exited the school bus.

* * * * *